United States Patent [19]

Royce

[11] 3,838,452

[45] Sept. 24, 1974

[54] RECORDING AMPLIFIER FOR BIAS-TYPE MAGNETIC RECORDING

[75] Inventor: William G. Royce, Littleton, Colo.

[73] Assignee: Honeywell Inc., Minneapolis, Minn.

[22] Filed: Dec. 7, 1972

[21] Appl. No.: 313,108

[52] U.S. Cl. .......................... 360/66, 330/22, 360/67
[51] Int. Cl. .............................................. G11b 5/44
[58] Field of Search ........... 179/100.2 R; 178/6.6 A; 330/22, 130; 331/185; 360/66, 67

[56] References Cited

UNITED STATES PATENTS

| | | | |
|---|---|---|---|
| 3,210,864 | 10/1965 | Tillotson et al. | 179/100.2 R |
| 3,324,250 | 6/1967 | Skov | 179/100.2 R |
| 3,368,032 | 2/1968 | Gooch et al. | 179/100.2 R |
| 3,394,234 | 7/1968 | Grace | 179/100.2 R |

*Primary Examiner*—Alfred H. Eddleman
*Attorney, Agent, or Firm*—Arthur H. Swanson; Lockwood D. Burton; Mitchell J. Halista

[57] ABSTRACT

A bias-type recording system using bias and data input signals which are amplified separately and applied to a signal summing amplifier which isolates the bias signal from the data signal by cancelling the bias signal collector current in a pair of transistor energized by the data and bias signals in a Class C mode of operation while allowing the data signal to vary the average collector current which appears as an output signal for application to a magnetic recording head.

2 Claims, 2 Drawing Figures

RECORDING AMPLIFIER FOR BIAS-TYPE MAGNETIC RECORDING

The present invention relates to amplifiers. More specifically, the present invention is directed to a recording amplifier for bias-type magnetic recording.

BACKGROUND OF THE INVENTION

In bias-type magnetic recording, it is necessary to supply the recording head with a current proportional to the input data signal and also with a much larger fixed bias current at a frequency several times the highest anticipated data frequency. In order to provide a satisfactory recording, the bias current must have a very small direct current component and a minimum of even harmonic distortion. At bias frequencies on the order of one 1 MHZ or higher, appreciable difficulty is usually found in conventional circuits in generating sufficient output power to the recording head with the requisite low distortion. An additional problem is that of preventing the bias amplifier and the usually large bias voltage from interfering with the signals on the data amplifier. The common solution to these problems has been to employ a balanced, transformer-coupled power amplifier for the bias current with tuned circuits to reduce the distortion and to provide isolation between the bias and data amplifiers.

An object of the present invention is to provide an improved bias-type recording system which combines the bias and data amplifiers into a single amplifier.

Another object of the present invention is to provide an improved bias-type recording system using a combined bias and data amplifier without transformers or tuned circuits.

SUMMARY OF THE INVENTION

In accomplishing these and other objects, there has been provided, in accordance with the present invention, a bias-type recording system using a data amplifier and a bias amplifier having output signals which are coupled in a summing amplifier for application to a recording head. The summing amplifier is arranged to isolate the signals from the data and bias amplifiers while providing a summing action for the output signals from the data and bias amplifiers to produce an output signal suitable for operating the recording head.

BRIEF DESCRIPTION OF THE DRAWINGS

A better understanding of the present invention may be had when the following detailed description is read in connection with the accompanying drawings, in which.

DETAILED DESCRIPTION

Figure 1:
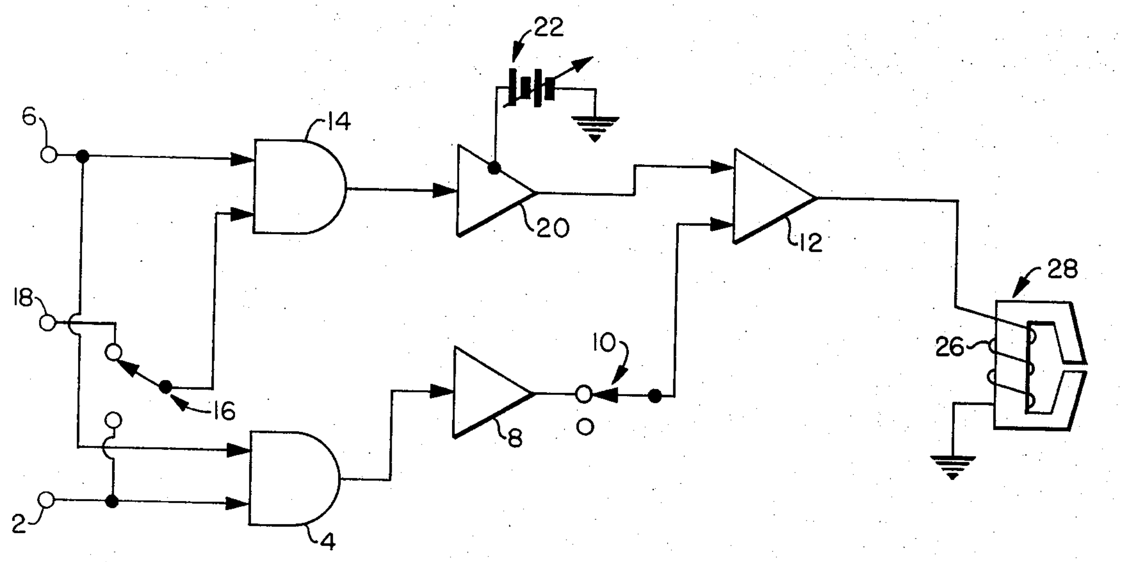
FIG. 1 is a block diagram of a recording system embodying the present invention.

Referring to FIG. 1 in more detail, there is shown a recording system having a data input terminal 2 connected to one input of a data gate represented as AND gate 4. A second input for the AND gate 4 is obtained from an "enable" signal input terminal 6 arranged to be connected to a source of enabling signals (not shown). The output signal from the AND gate 4 is applied through an amplifier 8 and a switch means 10 to a first input of a summing amplifier 12. A second input for the summing amplifier 12 is obtained from a circuit including the output of a second AND gate 14 having a first input signal applied from the "enable" signal input terminal 6 and a second input signal from the output of a signal-pole, double-throw switch 16. A first input for the switch 16 is taken from a bias signal input terminal 18 while a second input for the switch 16 is obtained from the data signal input terminal 2. The output signal from the second AND gate 14 is applied to a saturation driver amplifier 20 having a bias level control means 22 connected thereto. The output signal from the saturation driver amplifier 20 is applied as the second input signal to the summing amplifier 12. The output signal from the summing amplifier 12 is applied to a winding 26 on a magnetic recording head 28.

In operation, the second AND gate 14 is used to switch the recording function "on " or "off" and to provide a buffer between the bias input signal and the saturation driver amplifier 20. The "enable" input signal applied to the "enable" input terminal 6 controls the first AND gate 4 and the second AND gate 14 to allow input signals thereto to be applied to amplifiers 8 and 20, respectively. The output of the second AND gate 14 is a square wave to drive the saturating amplifier 20. The bias supply 22 connected to the saturation driver amplifier 20 is used to control the output level of the output signal from the driver amplifier 20 which output signal is applied as one input signal to the summing amplifier 12. The first amplifier 8 is used chiefly to prevent bias-frequency currents from being fed back to the data source connected to the data input terminal 2. The summing amplifier 12 provides a high output signal and impedance isolation between the amplifiers 8 and 20 and the record head 28. The summing amplifier 12 is arranged to have a low input impedance to sum its bias and data input currents while isolating the output signals from the amplifiers 8 and 20. The amplifier 12 is, also, arranged to have high output impedance to match the winding 26 to provide accurate current drive for the recording head 28 over a broad frequency range. The coupling capacitor in the summing amplifier 12 (as discussed hereinafter) is used to block direct current signals from the head 28 while providing a low impedance path for alternating current signals to the head 28. The switches 10 and 16 are operated concurrently to control the amplifier system for use as a saturation head driver system without bias for FM carriers or reference tones. Specifically, when the system is used as a saturation head driver the first switch 10 is used to interrupt the output of the first amplifier 8 from being applied to the summing amplifier 12 while the second switch 16 is arranged to concurrently apply the data input from the input terminal 2 to the second gate 14 in place of the bias signal on the bias input terminal 18.

Figure 2:
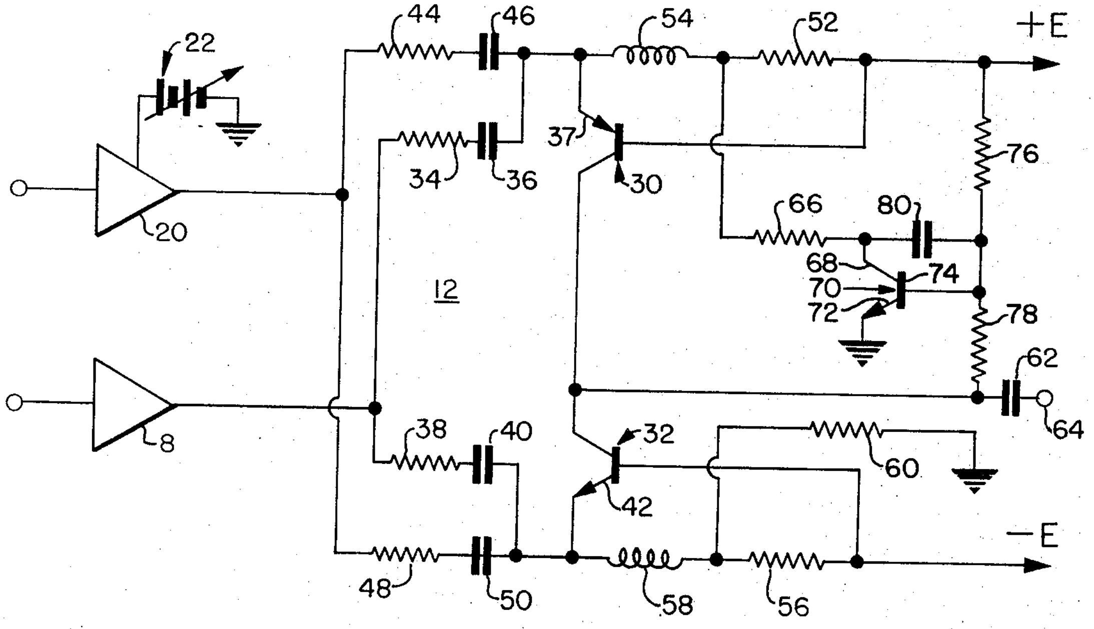
FIG. 2 is a schematic illustration of a summing amplifier suitable for use with the recording system shown in FIG. 1.

In FIG. 2 there is shown a schematic illustration of a circuit suitable for use as the summing amplifier 12 used in the recording amplifier system shown in FIG. 1. Similar numbers have been retained for elements common to FIGS. 1 and 2 specifically, the amplifiers 8 and 20 and the adjustable bias supply 22 for the saturation driver amplifier 20. The summing amplifier consists of a complimentary pair of grounded base transistors 30 and 32 each having emitters driven by both the saturation driver amplifier 20 and the data of buffer amplifier 8. The operation of the transistors is arranged to be so called "Class C" in that the current conduction angle of each collector is somewhat less than 180°. Such a circuit will not linearly sum two signals of arbitrary magnitude and ratio. Accordingly, in the intended application the high frequency bias current is always much larger than the data current to achieve the desired linearity for the data current while a very wide bandwidth is also achieved with the grounded-base configuration. The output signal from the data buffer amplifier 8 is connected through a series combination of a current limiting resistor 34 and a coupling capacitor 36 to the emitter of the first transistor 30. Similarly, the output from the data buffer amplifier 8 is connected through a series combination of a second current limiting resistor 38 and a coupling capacitor 40 to the emitter 42 of the second transistor 32.

The output signal from the saturation driver amplifier 20 is concurrently connected through a series combination of a third current limiting resistor 44 and a coupling capacitor 46 to the emitter 37 of the first transistor 30 and through a fourth current limiting resistor 48 and a fourth coupling capacitor 50 to the emitter 42 of the second transistor 32. A positive source of voltage +E is connected directly to the base of the first transistor 30 and through a series combination of a fifth resistor 52 and a choke 54 to the emitter 37. Similarly, a source of negative voltage −E is connected directly to the base of the second transistor 32 and through a series combination of a sixth transistor 56 and a second choke 58 to the emitter 42 of the second transistor 32. The junction between the sixth resistor 56 and the second choke is connected through a seventh resistor 60 to a ground or common connection. The collector of the first transistor 30 is connected to the collector of the second transistor 32 and through a sixth coupling capacitor 62 to an output terminal 64 which is the output of the summing amplifier 12. A junction between the first choke 54 and the fifth resistor 52 is connected through a collector load resistor 66 to the collector 68 of a third transistor 70. The emitter 72 of the third transistor 70 is connected to a ground or common return while the base 74 of the third transistor 70 is connected to the junction of a pair of voltage dividing resistors 76 and 78 connected in series between the source of positive voltage +E and the junction between the collectors of the first and second transistors 30 and 32. A seventh capacitor 80 is connected between the collector 68 of the third transistor 70 and the junction of the voltage dividing resistors 76 and 78.

In operation, a positive-going signal from the saturation driver amplifier 20 is effective to drive the first transistor 30 into a conducting state to cause its output to increase in a positive direction. Concurrently, the second transistor 32 is cut-off, i.e., driven into a non-conducting state, so that no change occurs in its output circuit at this time. On the other hand, a negative-going output signal from the amplifier 20 is effective to place the second transistor 32 in a conducting state while the first transistor 30 is cut-off and the output from the second transistor 32 in a negative direction increases in response to the negative-going input signal. With the transistors 30 and 32 each operating as half-wave amplifiers, there is a direct current average component in their collector current. These currents are supplied by the power sources +E and −E through resistors 52 and 56 and chokes 54 and 58 respectively. It is unlikely that these DC components are equal since the transistors 30 and 32 are randomly selected. This difference in the direct current component would flow into the record head 28 except for the presence of the blocking capacitor 62. This unbalanced DC would ordinarily cause the transistors 30 and 32 to approach a current saturation state which would sharply reduce the performance of the summing amplifier 12. The third transistor 70 and its associated component resistors 60, 66 76 and 78 and capacitor 80 is effective to correct this operation. The current flow in the resistor 60 causes a voltage drop in the resistor 56 which unbalances the stage by supplying a reverse bias signal to the base of the second transistor 32. This reverse bias tends to force the collectors of the transistor 30 and 32 to assume a positive voltage level with respect to the applied bias current.

This voltage state, in turn, is applied through the resistor 78 and is effective to forward bias the base of the third transistor 70. The collector current of the third transistor 70, accordingly, through a collector resistor 66 causes a saturation opposing effect in the resistor 52 and the first transistor 30. In effect, a feedback loop is established which forces the average collector current of the first and second transistors 30 and 32 to be near a zero level. The resistor 76 is arranged to supply the nominal base current for the third transistor 70 so that the nominal DC collector voltage for the first and second transistors 30 and 32 is zero. The capacitor 80 is arranged to reduce the gain of third transistor 70 for all signal frequencies to a negligible value so that the dynamic output impedance of the first and second transistors 30 and 32 remains at a high impedance level. A further benefit of the feedback loop provided by the circuit using the third transistor 70 is a significant reduction in the second-harmonic bias distortion. The relatively small data signal current from the amplifier 8, thus, is effective to simply vary the average collector currents of the transistors 30 and 32 in a manner of an ordinary direct current biased amplifier. The output current to the record head 28 is the sum of the currents from the amplifiers 8 and 20 less any circuit losses in the summing amplifier 12.

Accordingly, it may be seen that there has been provided, in accordance with the present invention, a bias-type recording system for supplying a recording head with data current with sufficient power for a bias current concurrently supplied to the recording head while maintaining isolation between the bias and data amplifiers.

The embodiments of the invention in which an exclusive property or privilege is claimed are defined as follows:

1. A recording system comprising a data amplifier, a saturation driver amplifier, and summing amplifier means for combining output signals from said data amplifier and said saturation driver amplifier and applying the combined signals to a magnetic recording means while providing electrical signal isolation between said saturation driver amplifier and said data amplifier wherein said summing amplifier includes a first transistor circuit having an input circuit and an output circuit, a second transistor circuit having an input circuit and an output circuit, said output circuit of said first transistor circuit being connected to said output circuit of said second transistor circuit and a feedback means connected between said output circuit of said first transistor circuit and said input circuit of said second transistor circuit and arranged to maintain an average output current of the first and second transistor circuits to be near zero.

2. A recording system as set forth in claim 1 and including in said feedback means a third transistor circuit, a feedback capacitor for said third transistor circuit arranged to reduce the gain of said third transistor circuit to a negligible value.

* * * * *